United States Patent [19]

Leppich

[11] 4,128,149

[45] Dec. 5, 1978

[54] PISTON ARRANGEMENT FOR A SHOCK ABSORBER

[75] Inventor: Erhard Leppich, Wolfsburg, Fed. Rep. of Germany

[73] Assignee: Volkswagenwerk Aktiengesellschaft, Wolfsburg, Fed. Rep. of Germany

[21] Appl. No.: 841,995

[22] Filed: Oct. 13, 1977

[30] Foreign Application Priority Data

Oct. 16, 1976 [DE] Fed. Rep. of Germany ....... 2646771

[51] Int. Cl.$^2$ .................................................. F16F 9/18
[52] U.S. Cl. ..................................... 188/322; 188/317
[58] Field of Search ......................... 188/282, 317, 322

[56] References Cited

U.S. PATENT DOCUMENTS

| | | | |
|---|---|---|---|
| 2,384,186 | 9/1945 | Magrum et al. | 188/322 X |
| 2,828,836 | 4/1958 | Kamman | 188/322 X |
| 3,199,638 | 8/1965 | Otomo | 188/322 X |

*Primary Examiner*—Duane A. Reger
*Attorney, Agent, or Firm*—Spencer & Kaye

[57] ABSTRACT

A piston arrangement for a shock absorber. A piston rod has a piston mounted on it, the piston being axially non-displaceable with respect to the piston rod. The piston has flow channels through which a damping medium may flow when the piston is axially displaced in the shock absorber. There are two valves for controlling the flow of medium when the piston is moved in opposite axial directions, respectively, each of which valves has a valve element that opens against a spring force, depending on the direction of axial movement of the piston and therefore on the direction of flow of the medium. This closure element of one of the valves includes a disc while the closure element of the other valve includes a sleeve which surrounds the piston rod. The sleeve has a flange which is exposed to the pressure of the medium when the valve is opened. This piston rod itself has a region of reduced diameter, part of which region is in axial alignment with the disc. The sleeve and disc form a space between themselves. The sleeve extends overlappingly through at least the reduced-diameter region of the piston. The one valve itself has a valve element associated with the disc and a spring which acts on this valve element. The valve element tightly surrounds the sleeve but permits axial movement relative thereto. The valve element has a second valve seat near its inner circumference and, under the influence of the spring, presses the disc near its outer circumference against a step of the piston.

12 Claims, 2 Drawing Figures

PISTON ARRANGEMENT FOR A SHOCK ABSORBER

BACKGROUND OF THE INVENTION

The present invention relates to a piston arrangement for a shock absorber of the type used in the wheel suspension for automotive vehicles. Piston arrangements of this type conventionally incorporate a piston which is mounted for reciprocatory movement within the shock absorber housing, this piston being carried by a piston rod on which the piston is mounted so as to be axially non-displaceable relative thereto. The piston has one or more channels through which a damping medium may flow when the piston is axially displaced in the shock absorber, there being two valves—a main or working valve and a check valve—for controlling the flow of the damping medium when the piston is moved in opposite axial directions, respectively. Each valve has a valve element which opens against a spring force, depending on the direction of axial movement of the piston and therefore on the direction of flow of the medium. The closure element of one of the two valves is in the form of at least one disc whereas the closure element of the other valve is in the form of a sleeve which surrounds the piston rod and which has a flange that is exposed to the pressure of the medium when the valve is opened.

In conventional piston arrangements of the above type, the sleeve is in the shape of a small cup which, when the valve is closed, overlies the flow channels in the piston which are arranged relatively well within the interior of the piston. The piston generally has additional flow channels which are radially outward of the first-mentioned flow channels, these further channels being covered by at least one disc when the respective valve is closed.

A number of advantages are obtained if the closure elements are constituted by disc-type springs rather than by rigid discs. For one thing, it is easier and less expensive to manufacture the mechanism. Furthermore, by selecting disc-type springs having appropriate parameters, the shock absorber can be given virtually any desired damping characteristic, even a quite complicated damping characteristic. On the other hand, disc-type springs have the drawback that they take up a relatively large amount of space, particularly if the shock absorber is to have a favorable damping characteristic. Conventionally, some space saving is sought to be realized by positioning the flow channels associated with the two valves radially next to each other, so that when the valve which includes the cup-shaped closure element is open, the damping medium will be supplied by way of a flow path which is interiorly of the disc.

It is, therefore, the object of the present invention to provide a piston arrangement of the above general type in which the parts are so arranged as to require a minimum of space within the cylinder of the shock absorber.

BRIEF DESCRIPTION OF THE INVENTION

With the above object in view, the present invention resides in a piston arrangement for a shock absorber of the above-described type in which the piston rod has a region of reduced diameter, part of which region is in axial alignment with the disc. The sleeve and the disc form a space between themselves, with the sleeve extending overlappingly through at least this reduced-diameter region of the piston rod. When the valve of which the sleeve is a part is closed, the sleeve bears with its flanged end against a first valve seat thereby to seal off the reduced diameter region of the piston rod, whereas when this valve is open, medium may flow through both ends of the reduced diameter region of the piston rod. The valve which includes the disc has a valve element associated with this disc as well as a spring acting on the valve element. The latter is arranged on that side of the disc which is directed away from the flange of the sleeve. The valve element tightly surrounds the sleeve but permits axial movement relative thereto. The valve element has a second valve seat near its inner circumference and the valve element, under the influence of the spring, presses the disc near its outer circumference against a step of the piston.

DETAILED DESCRIPTION OF THE PREFERRED EMBODIMENTS

Figure 1:
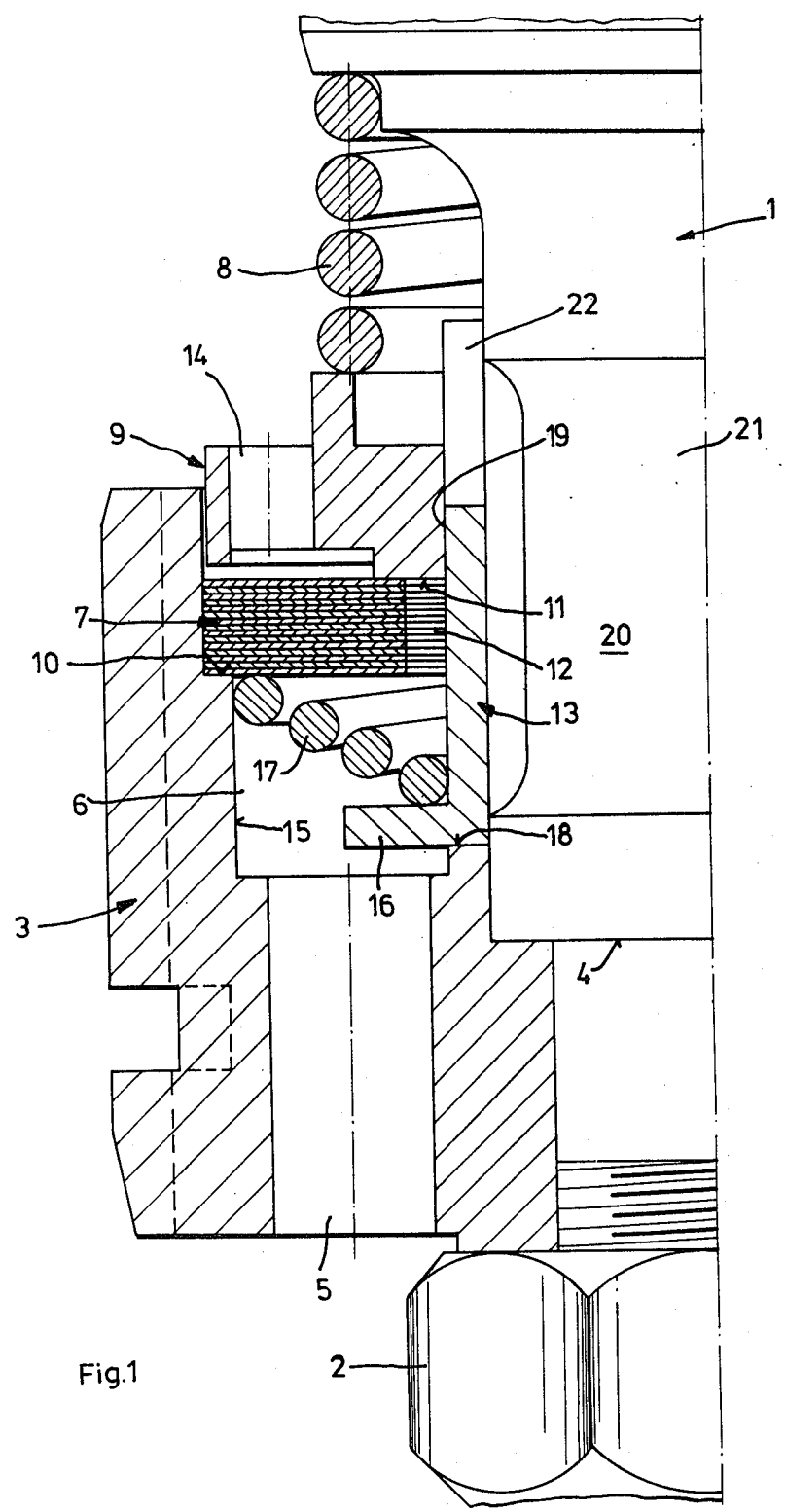
FIG. 1 is a sectional view showing half of the structure of one embodiment of a piston arrangement according to the present invention.

Referring now to the drawings and first to FIG. 1 thereof, the same shows one embodiment of a piston arrangement which incorporates a piston rod, the same having a number of successive regions of different diameter so as to form a plurality of steps. A nut 2 is screwed to the free end of the piston rod 1—this being the lower end as viewed in FIG. 1—and serves to hold in place a piston 3 which is firmly pressed against the step 4 of the piston rod so that the piston 3 is axially non-displaceable with respect to the piston rod 1. The piston 3 is slidably arranged for reciprocatory movement within a cylinder (not shown) of a telescoping shock absorber of the type suitable for use in motor vehicle wheel suspensions, there being a conventional damping medium, usually a liquid, within the shock absorber.

The lower region of the piston 3, as viewed in FIG. 1, is provided with a plurality of flow channels, one of which is shown at 5. These channels allow the flow of the damping medium in both directions, it being evident that the direction in which the medium will flow will depend on whether the shock absorber is subjected to a pulling force which extends the shock absorber—this being the "working direction"—or to a compressing force—this being the "return direction"—which causes the parts to be telescoped together. As shown in the drawing, the flow channels communicate with an interior annular chamber 6 whose main function is to provide space for the parts which form the valves.

The valve mechanism associated with the piston arrangement includes a main valve which controls the flow of fluid in the shock absorber when the piston is moved upwardly, as viewed in FIG. 1, this being the working direction in which the piston moves when the shock absorber is subjected to a pull that extends the parts. It is the operation of this valve which determines the characteristic of the shock absorber. The main valve comprises a stack of disc-type annular springs 7 which are under the influence of a compression spring 8, the latter acting through the intermediary of a valve element 9 which itself has a plurality of flow channels one of which is shown at 14. The arrangement of the parts is such that the stack of springs is pressed against a step 10 formed on the inside of the piston 3 as well as against the underside of the valve element 9, this underside constituting a valve seat 11. The structure further comprises a sleeve-shaped part 13 having at its lower end a flange 16, the purpose of which will be explained in further detail below. As shown in FIG. 1 at 12, the inner peripheral edges of the springs 7 are spaced from the outer surface of the sleeve 13.

When the piston moves upwardly, as viewed in FIG. 1, the fluid flowing through flow channels 14 of the valve element 9 will press the inner peripheral region of the springs 7 downwardly, so that the springs will disengage themselves from the valve seat 11, thus allowing damping medium to flow downwardly through the annular gap 12 which is formed between the inner edges of the springs 7 and the outer surface of the sleeve 13.

The distance between the inner surface 15 of the annular chamber 6 and the outer peripheral surface of the flange 16 of the sleeve 13 is so selected that the restriction formed between 15, 16 will produce a desired throttling effect. This, as will be explained in connection with FIG. 2, makes it unnecessary to provide the valve element 9 with specially calibrated flow channels. This is so because the sleeve 13 fulfills the function of a throttling device for the medium flowing through the valve which incorporates the springs 7. In addition, the sleeve 13 fulfills yet another function, in that it acts as a closure element for the check or nonreturn valve of the piston arrangement insofar as the reverse direction of flow is concerned. This will likewise be explained in more detail below.

Considering next the check valve, the same is made up in part of the already-mentioned sleeve 13 which is pressed downwardly, as viewed in FIG. 1, by a conical spring 17, the upper end of which engages the underside of the outer peripheral region of the lowermost one of the springs 7. The lower end of the spring 17 engages the upper surface of the flange 16 of the sleeve 13. Consequently, the sleeve 13 is urged against a valve seat 18 which is constituted by an upper annular surface of the piston 3. As is likewise apparent from the drawing, the outer surface of the sleeve 13 forms a tight fit, i.e., is in sealing engagement with, the inner surface of the valve element 9.

With the parts shown in the position depicted in FIG. 1, where the sleeve 13 is pressed downwardly against the valve seat 18, the sleeve 13 seals off an annular channel 20 which is formed as the result of a reduced diameter of the piston rod 1 in the region indicated at 21. The sleeve 13 is provided at its upper end with slit-like openings 22 which communicate with the annular channel 20 and allow the damping medium to flow into this channel, these inlet openings being so arranged that damping medium may flow into the channel 20 irrespective of the position of the sleeve 13.

As soon as the piston 3 is moved downwardly, as viewed in FIG. 1—this downward movement corresponding to a return movement of the parts where they are telescoped into each other—the force which the damping medium exerts on the lower surface of the flange 16 becomes sufficiently large to move the sleeve 13 upwardly against the force of the spring 17, so that the sleeve 13 now lifts off the valve seat 18 and provides an open passage that allows the medium to flow to the lower end of the annular channel 20. In this way, there is formed a continuous passage from the region of the spring 8 to the flow channels 5, this passage being established by way of the annular channel 20.

Figure 2:
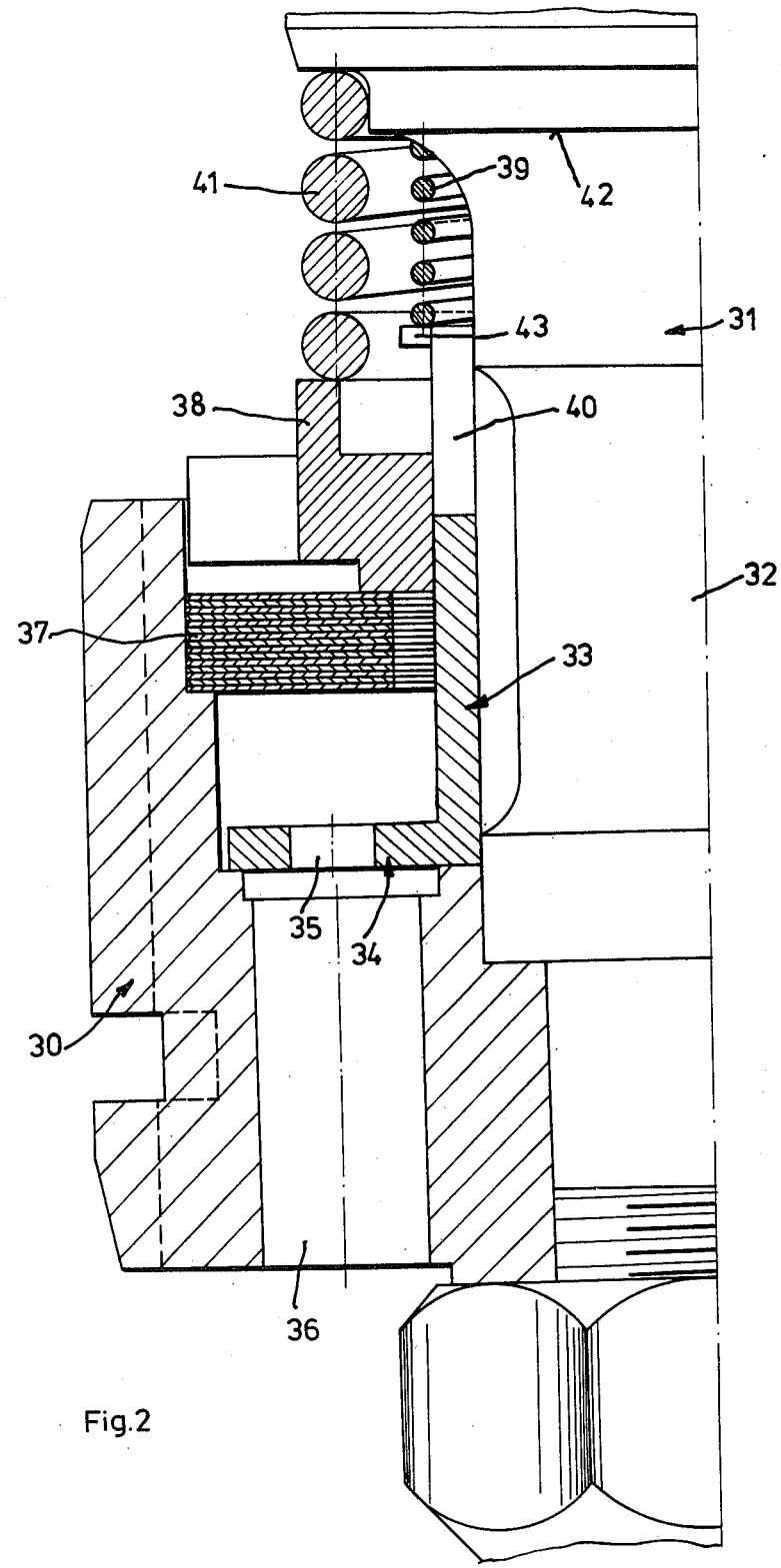
FIG. 2 is a sectional view showing half of the structure of another embodiment of a piston arrangement according to the present invention.

Referring now to FIG. 2, the same shows another embodiment of a piston arrangement according to the present invention, the same incorporating a piston 30 mounted on a piston rod 31 which itself is provided with a region 32 of reduced diameter, these parts being similar to the piston rod 1 and piston 3 described above in connection with the embodiment of FIG. 1. Here, too, there is a check valve which comprises a sleeve 33 having a flange 34, the latter differing from the flange 16 of the sleeve 13 of the embodiment of FIG. 1 in that the flange 34 extends radially outwardly sufficiently so as to overlie the flow channels 36 with which the piston 30 is provided. The flange 34 is provided with openings 35 which are in alignment with the flow channels 36 and serve to throttle the flow of damping medium. In this way, the sleeve 33 of the check valve controls the flow of medium through the main valve whose closure element is, as in the embodiment of FIG. 1, constituted by a stack of disc-type annular springs 37. Similarly, the upper end of sleeve 33 is provided with slit-like openings 40.

The embodiment of FIG. 2 differs from that of FIG. 1 in several respects. For one thing, the valve element 38 is not provided with any flow channels comparable to the flow channels 14 of the valve element 9, so that the valve element 38 can easily be manufactured by conventional stamping methods. For another, the spring acting on the sleeve 33 is not interposed between the upper surface of the flange and the underside of the lowermost one of the disc-type annular springs, rather, there is a spring 39 which is arranged interiorly of the spring 41 associated with the main valve and is interposed between a collar 42 of the piston rod 31 and a widened portion of the upper end of the sleeve 33. This widened portion can be constituted by radial webs or projections 43 or the like. As a practical matter, such projections serve an additional useful purpose in that they make it possible to combine some of the parts into a sub-assembly, namely, the parts 33, 39, 37, 38 are placed onto the piston rod 31, after which the projections 43 are formed. This holds the mentioned parts together so that the sub-assembly, which can be made at a separate work station, can then be brought to another work station where it is assembled with the other parts. This is of importance from the mass-production point of view, so that a piston assembly according to the present invention can incorporate the projections 43 even if the spring 39 is not in the position shown in FIG. 2 but is a conical spring interposed between the flange 34 and the stack of the springs 7, cf., spring 17 in the embodiment of FIG. 1.

It will be understood from the above that while in conventional piston arrangements for shock absorbers, as explained above, the cup-shaped part and the rigid disc follow each other in axial direction, the closure elements of a piston arrangement according to the present invention follow each other in radial direction. In addition, the present invention allows the use of disc-type springs, which makes it possible to obtain favorable damping characteristics, as is likewise mentioned above. Moreover, the reduced diameter region of the piston rod provides for at least one flow channel which is interiorly of the sleeve. It will be noted, in this connection, that the flow channel afforded by the piston rod can be constituted by one or more grooves formed in the piston rod, or it can be formed by letting the reduced diameter extend about the entire circumference of the piston rod 1, 31, so as to form an annular chamber.

It will likewise be appreciated that, in accordance with the present invention, the flow channels in the piston 3, 30, will let the damping medium flow in both directions. These flow channels communicate with the interior annular chamber which accommodates the two closure elements of the two valves. It is here that the two flow paths, depending on the direction of travel of the piston, are split up, because the flow path for medium leaving the check valve is constituted by the passage formed as the result of the reduced diameter portion of the piston rod 1, 31, whereas the flow path for the main valve is constituted by bores or other openings in the respective valve element as well as by the space formed between the inner edge of the disc-type springs and the outer surface of the sleeve. This results in yet another advantage, namely, the medium will flow through two separate flow paths, depending on the direction of flow, which prevents a hysteresis effect resulting from the formation of air bubbles in the immediate region of the valves.

Yet another advantage of the present invention is that the springs 7, 37 can have relatively large diameters without requiring excessively large radial dimensions of the piston and hence of the shock absorber as a whole. Even the overall axial length can be kept small because the main valve and the check valve are radially next to each other, that is to say, at approximately the same axial level. All of these advantages are obtained without sacrificing any of the desired operational characteristics of the shock absorber.

It will be understood that the above description of the present invention is susceptible to various modifications, changes and adaptations, and the same are intended to be comprehended within the meaning and range of equivalents of the appended claims.

What is claimed is:

1. A piston arrangement for a shock absorber, comprising a piston rod; a piston arranged on said piston rod so as to be axially non-displaceable relative thereto and having flow channels through which a damping medium may flow when said piston is axially displaced in the shock absorber; two valves for controlling the flow of medium when said piston is moved in opposite axial directions, respectively, each valve having a valve element which opens against a spring force, depending on the direction of axial movement of said piston and therefore on the direction of flow of the medium; the closure element of one of said valves comprising at least one disc and the closure element of the other of said valves comprising a sleeve which surrounds said piston rod, said sleeve having a flange which is exposed to the pressure of the medium when the valve is opened; said piston rod having a region of reduced diameter, part of which region is in axial alignment with said disc; said sleeve and said disc forming a space between themselves; said sleeve extending overlappingly through at least said region of said piston rod; said sleeve, when said other valve is closed, bearing with its flanged end against a first valve seat thereby to seal off said region of said piston rod and, when said other valve is open, allowing the flow of medium through both ends of said region of said piston rod; said one valve further comprising a valve element associated with said disc and a first spring acting on said valve element, said valve element being arranged on that side of said disc which is directed away from said flange of said sleeve; said valve element tightly surrounding said sleeve but permitting axial movement relative thereto; said valve element having a second valve seat near its inner circumference; said valve element, under the influence of said spring, pressing said disc near its outer circumference against a step of said piston.

2. A piston arrangement as defined in claim 1, wherein said other valve comprises a second spring which is interposed between said flange of said sleeve and said disc of said one valve.

3. A piston arrangement as defined in claim 2, wherein said second spring is a conical spring whose larger end engages said disc.

4. A piston arrangement as defined in claim 1, wherein said other valve comprises a second spring which is interposed between a collar on said piston rod and that end of said sleeve which is opposite the end at which said flange is arranged.

5. A piston arrangement as defined in claim 4, wherein said second spring is arranged interiorly of said first spring.

6. A piston arrangement as defined in claim 1, wherein said sleeve is provided with at least one radial projection located at that end of said sleeve which is opposite to the end at which said flange is arranged.

7. A piston arrangement as defined in claim 1, wherein the reduced diameter of said region of said piston rod extends about the entire circumference of said piston so as to form an annular chamber, the axial length of said sleeve being greater than that of said region of said piston rod, and said sleeve having openings which, in all positions of said sleeve, communicate with said annular chamber.

8. A piston arrangement as defined in claim 7, wherein said openings are constituted by slits which are located at that end of said sleeve which is opposite to the end at which said flange is arranged.

9. A piston arrangement as defined in claim 1, wherein said other valve is a check valve which opens to allow the flow of medium when said piston moves in the return direction opposed to the working direction.

10. A piston arrangement as defined in claim 1, wherein said flange of said sleeve, when said other valve is closed, overlies said flow channels of said piston and serves as a throttling means for said one valve.

11. A piston arrangement as defined in claim 10, wherein, when said other valve is closed, the outer peripheral edge of said flange and a wall of an interior chamber in said piston with which chamber said flow channels of said piston communicate, form between themselves a restriction which overlies said flow channels, said restriction constituting said throttling means.

12. A piston arrangement as defined in claim 10, wherein said flange of said sleeve is provided with throttling openings which, when said other valve is closed, overlie said flow channels, said throttling openings constituting said throttling means.

* * * * *